(12) United States Patent
Svec

(10) Patent No.: US 10,685,019 B2
(45) Date of Patent: Jun. 16, 2020

(54) SECURE QUERY INTERFACE

(71) Applicant: salesforce.com, inc., San Francisco, CA (US)

(72) Inventor: Brandon Svec, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 501 days.

(21) Appl. No.: 15/487,954

(22) Filed: Apr. 14, 2017

(65) Prior Publication Data

US 2018/0300369 A1  Oct. 18, 2018

(51) Int. Cl.
*G06F 16/25* (2019.01)
*G06F 16/2453* (2019.01)
*G06F 16/248* (2019.01)
*G06F 16/2455* (2019.01)

(52) U.S. Cl.
CPC ...... *G06F 16/24544* (2019.01); *G06F 16/248* (2019.01); *G06F 16/2455* (2019.01); *G06F 16/24532* (2019.01); *G06F 16/252* (2019.01)

(58) Field of Classification Search
CPC ............. G06F 16/24544; G06F 16/252; G06F 16/248; G06F 16/2455; G06F 16/24532
See application file for complete search history.

(56) References Cited

U.S. PATENT DOCUMENTS

| | | | | |
|---|---|---|---|---|
| 8,510,290 B1* | 8/2013 | Brown | | G06F 16/2228 |
| | | | | 707/711 |
| 9,239,851 B1* | 1/2016 | Messer | | G06F 16/27 |
| 9,378,229 B1* | 6/2016 | Burger | | G06F 16/2272 |
| 10,216,861 B2* | 2/2019 | Barsness | | G06F 16/90335 |
| 2004/0254920 A1* | 12/2004 | Brill | | G06F 16/9535 |
| 2005/0149552 A1* | 7/2005 | Chan | | G06F 16/211 |
| 2007/0239797 A1* | 10/2007 | Cattell | | G06F 16/217 |
| 2008/0021884 A1* | 1/2008 | Jones | | G06F 16/951 |
| 2010/0205217 A1* | 8/2010 | Kocsis | | G06F 16/972 |
| | | | | 707/784 |
| 2011/0113062 A1* | 5/2011 | Quinlan | | G06F 16/951 |
| | | | | 707/770 |
| 2012/0096030 A1* | 4/2012 | Kim | | G06F 16/3349 |
| | | | | 707/775 |
| 2013/0198232 A1* | 8/2013 | Shamgunov | | G06F 16/2471 |
| | | | | 707/770 |
| 2015/0154200 A1* | 6/2015 | Lightner | | G06F 16/285 |
| | | | | 707/693 |
| 2016/0026683 A1* | 1/2016 | Sah | | G06F 16/2453 |
| | | | | 707/770 |
| 2016/0050167 A1* | 2/2016 | Ramachandran | | H04L 51/046 |
| | | | | 709/204 |
| 2016/0063063 A1* | 3/2016 | Tsai | | G06F 16/284 |
| | | | | 707/755 |
| 2016/0342661 A1* | 11/2016 | Kumarasamy | | G06F 16/22 |
| 2017/0293530 A1* | 10/2017 | Brodt | | G06F 16/2365 |
| 2018/0005161 A1* | 1/2018 | Cong | | G06Q 10/06393 |

(Continued)

*Primary Examiner* — Alicia M Willoughby
(74) *Attorney, Agent, or Firm* — Morris & Kamlay LLP

(57) ABSTRACT

One or more computing devices may execute procedures to select a query from a query database in response to a request from a remote application. The selected query may be applied to a target database and a result may be returned. The result may be processed to generate a response for the remote application. The response may be provided to the remote application for execution of an operation by the remote application.

32 Claims, 15 Drawing Sheets

(56) References Cited

U.S. PATENT DOCUMENTS

| | | | |
|---|---|---|---|
| 2018/0018367 A1* | 1/2018 | Cui | G06F 16/24534 |
| 2018/0060362 A1* | 3/2018 | Chidambaran | G06F 16/2219 |
| 2018/0075493 A1* | 3/2018 | Agarwal | G06Q 30/0275 |
| 2018/0137184 A1* | 5/2018 | Adamut | H04L 67/02 |
| 2018/0189328 A1* | 7/2018 | Frazier | G06F 16/25 |

* cited by examiner

US 10,685,019 B2

SECURE QUERY INTERFACE

BACKGROUND

Many applications depend on large datasets. The optimal execution environment for an application or an application server often differs from the optimal execution environment for a database upon which the application depends. As a result, applications are often either developed to run in suboptimal environments or to accept a lower standard of security or availability when accessing certain databases.

BRIEF DESCRIPTION OF THE DRAWINGS

The accompanying drawings, which are included to provide a further understanding of the disclosure, are incorporated in and constitute a part of this specification. The drawings also illustrate implementations and embodiments of the disclosure and together with the detailed description serve to explain the principles of implementations and embodiments of the disclosure. No attempt is made to show structural details in more detail than may be necessary for a fundamental understanding of the disclosure and various ways in which it may be practiced.

DETAILED DESCRIPTION

Figure 1:
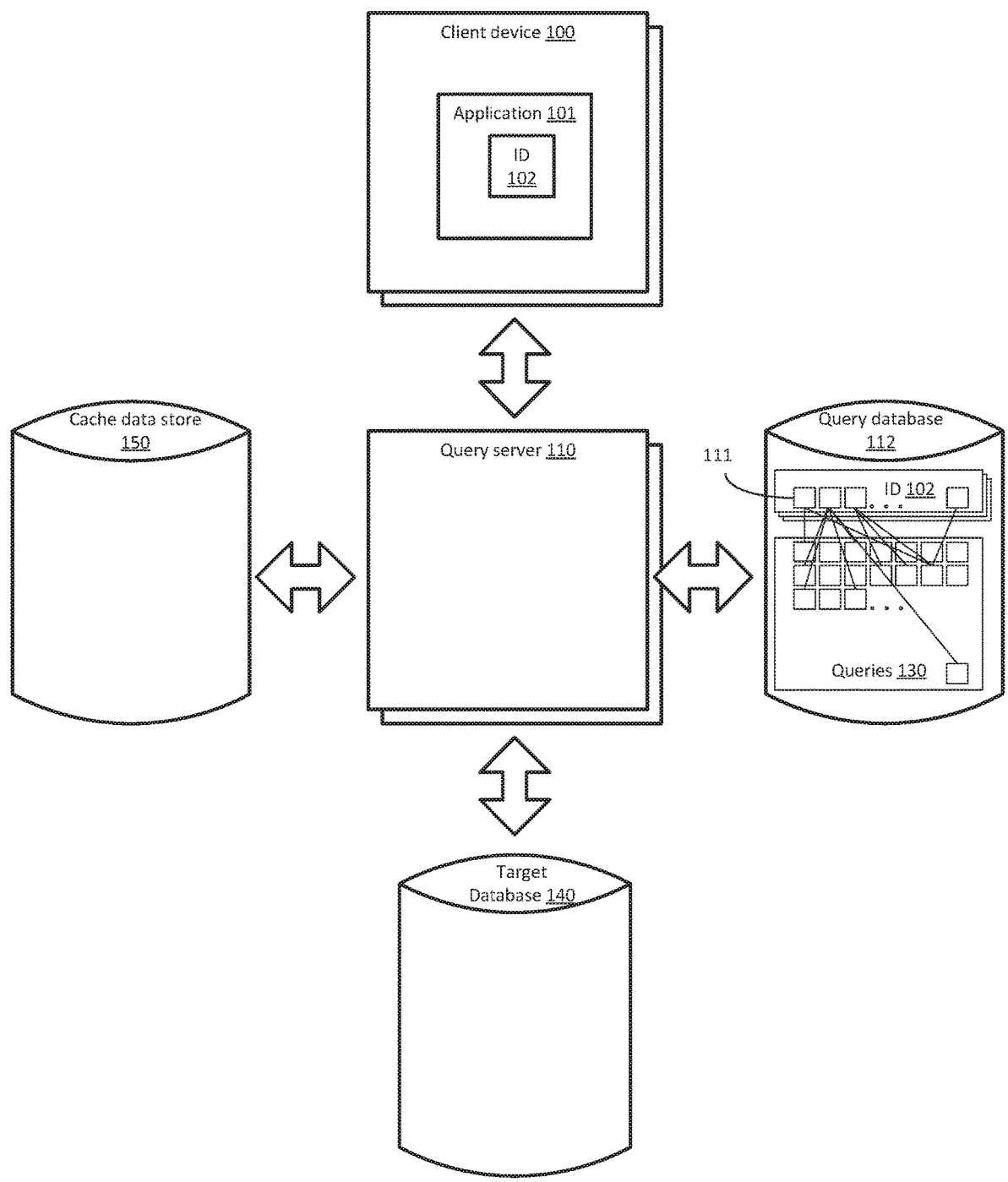
FIG. 1 shows an example system diagram of a component environment according to an implementation of this disclosure.
Figure 2:
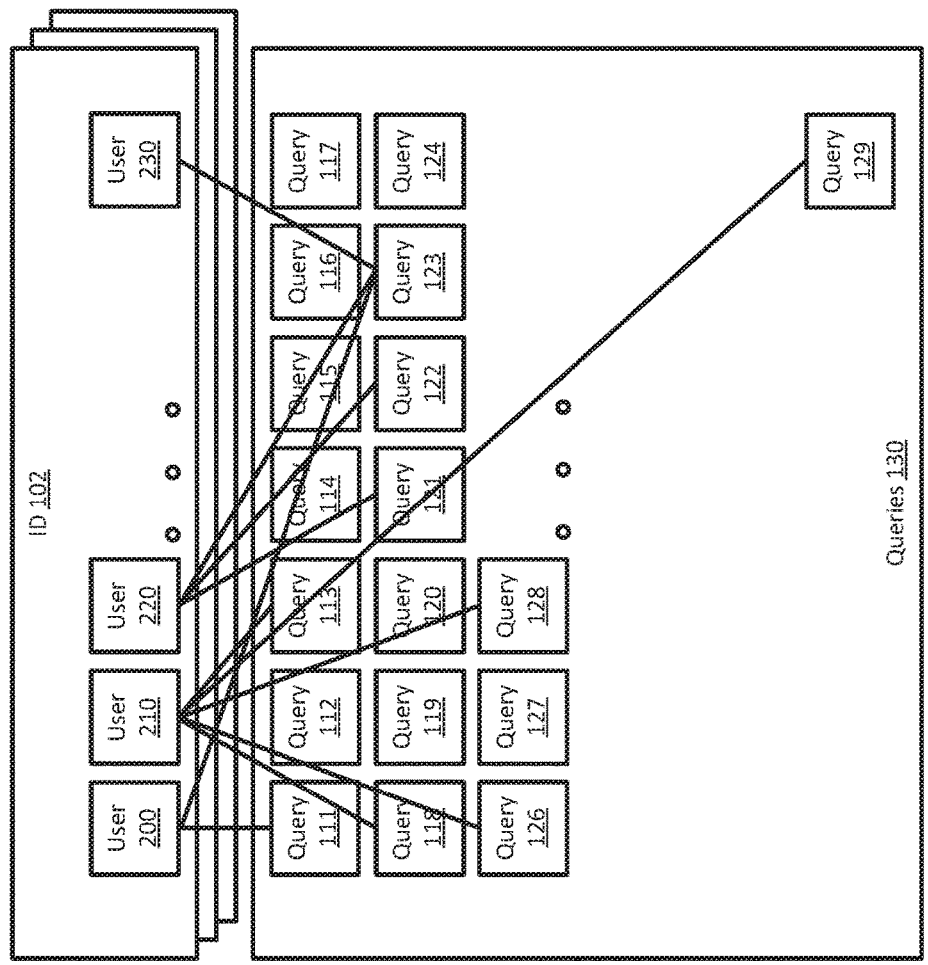
FIG. 2 shows an example system diagram of the relationship between account identifiers, users, and queries according to an implementation of this disclosure.

Applications often depend on databases or database platforms having a relational database management system operating in accordance with a structured query language (SQL), such as Microsoft® SQL Server. These databases are often included within integrated application frameworks that include a framework class library, common language runtime, and directory service such as the Microsoft® .NET framework. As a result, many applications that depend on these databases are often written to operate in these integrated application frameworks to take advantage of security or interoperability functionality.

Applications that run within such integrated application frameworks often have disadvantages. For example, such applications may have difficulty interfacing with non-SQL servers such as Linux® servers and functioning with operating systems not defined within the integrated application framework. Further, such applications may have limited object-relational support and perform more slowly at certain tasks, such as tasks requiring concurrent reading, writing, or manipulation of large datasets.

Certain applications developed to operate in different frameworks, such as non-.NET frameworks like the Java® platform, may have advantages in providing object-relational support. However, such applications may have difficulty interfacing with certain SQL databases and may have security vulnerabilities because they do not have access to certain directory services when accessing SQL databases. For example such applications may have difficulty accessing those directory services available within the .NET framework, such as the Microsoft Active Directory™ service.

To address issues including those described above, implementations of this disclosure can provide an interface that efficiently handles application requests from applications outside of the .NET framework while providing the secure database access enabled by directory services provided within the .NET framework. For example, implementations of this disclosure may include an application programming interface (API) for providing such functionality.

In an implementation, a set of one or more queries can be stored in a query database and associated with an account identifier. A target SQL database may store a dataset that serves an application running on a client device. The application may operate in accordance with a representational state transfer (ReST) architecture and may be associated with the same account identifier that is associated with the set of one or more queries. The application may perform an operation that depends on the execution of a query in the query database against the dataset in the target database. As a result, the application can transmit a request for the needed query to one or more query servers in communication with the query database. The application request may include parameters such as the application's account identifier.

The query servers may be network servers that receive a large number of requests and may process such requests efficiently based on the server's execution environment. For example, the query servers may include services that execute procedures in accordance with an event-driven, asynchronous environment, such as the Node.js® environment. As a result, the query servers can receive the application request and efficiently select a query from the query database based on parameters including the account identifier. The query servers can then transmit the selected query to the target database for execution.

The target database may receive the selected query, execute the query against the target database, and transmit the result back to the query servers. In response to receiving the result, the query servers can process the result and generate a response for the application. The response can be generated in an interchange format suitable for a configuration of the application, such as a JavaScript Object Notation (JSON) format. The query server can then transmit the formatted response to the application where the application may process the response to perform the operation that depends on the query.

Component Environment

Implementations of this disclosure may execute in a variety of component environments. For example, FIG. 1 shows an example system diagram of a component environment according to an implementation of this disclosure. Client device 100 may execute application 101 having account identifier 102. Client device 100 may be a set of any one or more computing devices suitable for the purposes of this disclosure, such as any of those computing devices discussed below with respect to FIG. 14. In general as discussed herein, any computing device may include any computing device discussed below with respect to FIG. 14, an entity included in a set or a component included in an item may be included without limitation, and a set of entities may include a single entity or multiple entities. Client device 100 may be in communication with query server 110 via any network connection suitable for the purposes of this disclosure, such as any network discussed below with respect to FIG. 15.

Application 101 may be any application that requests access to a database. For example, application 101 may include applications that manipulate an account's web service calls so that the calls may be authenticated in a different account; middle-tier worker processes that call ReST routes in a target database; publication-subscriber systems; applications that track subscriber data across multiple data sources; applications that monitor worker usage datasets and upload day-to-day metrics to management databases; worker process management applications; applications that bulk upload anti-distributed-denial-of-service attack data; applications initially developed for SQL Server; applications developed in the Cask Data Application Platform; platform-as-a-service applications; middle-tier caching applications; and applications that provide SQL authentication services without requiring direct access to a SQL database, such as merchant customer exchange services. Application 101 may include instructions written in accordance with any programming language suitable for the purposes of this disclosure. For example application 101 may include program code written in the JavaScript® language, including JQuery, VB Script® language, hypertext markup language, cascading style sheet language, asynchronous JavaScript and extensible markup language (XML), or the Python® language.

Figure 14:
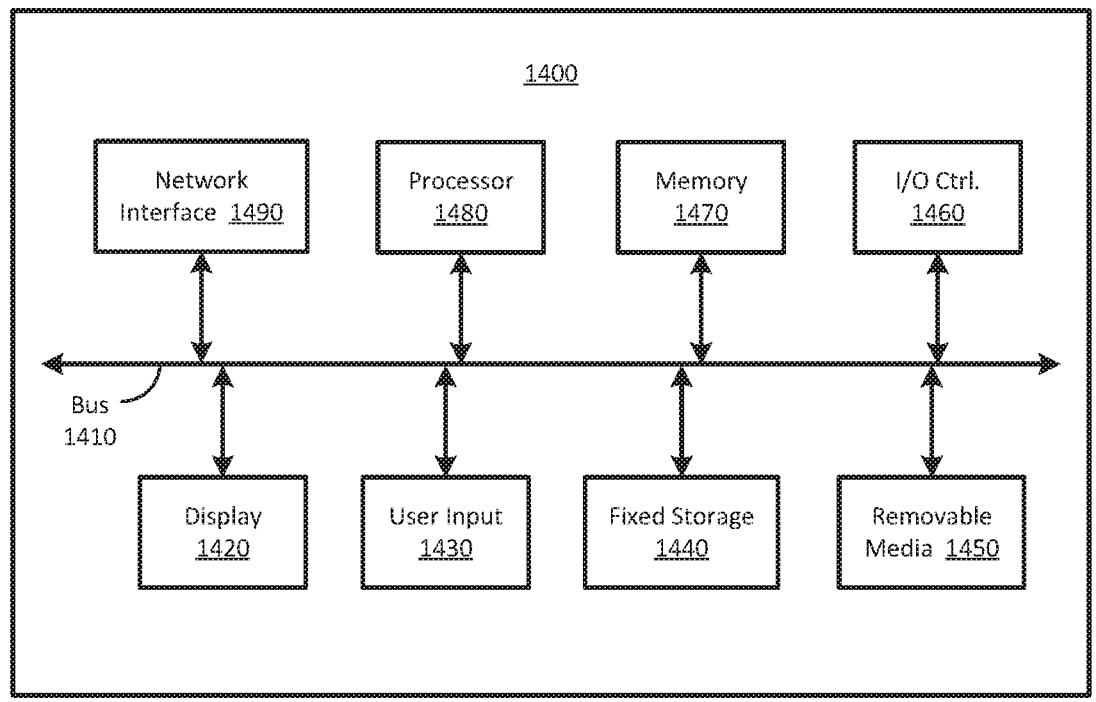
FIG. 14 shows an example computing device according to an implementation of this disclosure.

Query server 110 may be a set of any one or more computing devices suitable for the purposes of this disclosure, such as any of those computing devices discussed below with respect to FIG. 14. For example query server 110 may include a first application server that can execute operations in accordance with a first execution environment and a second application server that can execute operations in accordance with a second execution environment that is distinct from the first execution environment. For example, the first execution environment may include an environment having a non-blocking, asynchronous, event-driven architecture, such as the Node.js environment. For example, the second execution environment may include an environment having a framework class library and a common language runtime, such as the .NET environment.

One or more computing devices of query server 110 such as the first application server and the second application server may be in communication with one another and with other computing devices or other components of query server 110, such as a server that executes a directory service, such as Microsoft Active Directory service. Query server 110 may be in communication with query database 112, cache data store 150, and target database 140 via any network connections suitable for the purposes of this disclosure, such as any network discussed below with respect to FIG. 15.

Query database 112 may include management procedures and data structures executing on a set of one or more computing devices, such as query server 110 or remote from query server 110. In general, database 112 and any other database discussed herein may include any structured arrangement of data that persists in data and metadata and that is suitable for the purposes of this disclosure, such as any of those discussed with respect to FIG. 15 below. For example, in implementations of this disclosure, database 112 may be a database type such a Microsoft Azure® SQL cloud database, SQL Server database, Amazon® AWS cloud database, Postgres database, Mysql Server database, Oracle® 12c database, Apache HBase™ database, Bigtable™ database, MongoDB™ database, a NoSQL database, or a NewSQL database.

Query database 112 may store a set of one or more queries 130 associated with one or more account identifiers, such as account identifier 102 associated with application 101 executing on client device 100. In general, any association discussed herein between two or more entities can include referencing, cross-referencing, linking, coupling, storing in or with, or otherwise relating one entity with or to another entity, such as in a database. In implementations of this disclosure, application 101 can request that queries associated with account identifier 102 be executed against target database 140. Further discussion of relationships between account identifiers, queries, and users associated with account identifiers is included below with respect to FIG. 3.

Cache data store 150 may include management procedures and data structures executing on a set of one or more computing devices, such as query server 110 or remote from query server 110. In general, cache data store 150 and any other data store discussed herein may include any repository for persistently storing and managing datasets that is suitable for the purposes of this disclosure, including a databases and other data stores such as are discussed below with respect to FIG. 15. In implementations of this disclosure, cache data store 150 may provide lower latency read and/or write operations than a primary data store, such as target database 140.

Target database 140 may store a dataset that serves an application such as application 101. In general target database 140 and any other database discussed herein may include any structured arrangement of data that persists in data and metadata and that is suitable for the purposes of this disclosure, such as any of those discussed with respect to FIG. 15 below. In implementations of this disclosure, target database 140 may include management procedures and data structures executing on a set of one or more computing devices remote from query server 110 or executing on query server 110.

Account Identifiers, Users, and Queries

Implementations of this disclosure may store a set of one or more database statements, such as queries in a database such as query database 112. For example, query database 112 can store queries 130, user identifiers 200, 210, 220, 230, and account identifiers, such as account identifier 102 and other parameters. Queries 130 may include an arbitrary quantity of queries 111-129. In implementations of this disclosure, a query, such as any of queries 130 may include statements such as select, update, delete, insert into, create database, alter database, create table, alter table, drop table, create index, drop index, and so forth. For example, a first request may be received by query server 110 from first application 101 that includes a request to insert one million or more rows into a second database, such as target database 140. Query server 110 can select a first query from query database 112 that includes a statement to execute a bulk insert operation on target database 140. The bulk insert operation can insert one million or more rows into target database 140.

In implementations of this disclosure, account identifiers such as account identifier 102 can be associated with an application, such as application 101, and an account identifier may include or otherwise be associated with a set of one or more users and user identifiers, such as the arbitrary quantity of user identifiers 200, 210, 220, 230. For example, an organization may have an account with application 101. The account may be associated with account identifier 102. The organization may have a set of one or more users having one or more user identifiers 200, 210, 220, 230. A user may be associated with one or more queries. For example, the user associated with user identifier 200 may be associated with query 111 and query 123; or user identifier 210 may be associated with query 113, 118, 126, 128, and 129.

In implementations of this disclosure, an association of each of a set of queries with a respective account identifier of a set of account identifiers may include an association of each of the set of queries with a respective user identifier of a set of user identifiers and an association of each of the set of user identifiers with a respective account identifier of the set of account identifiers. For example, there may be 10 queries, 7 user identifiers, and 2 account identifiers. The first account identifier may only be associated with 4 of the user identifiers and the second account identifier may only be associated with the remaining 3 user identifiers. All 10 of the queries may be associated with at least 1 of the user identifiers, and 1 of the queries may be associated with a user identifier associated with the first account identifier and a user identifier associated with the second account identifier. In this way, each of the 10 queries may be associated with a respective user identifier of the 7 user identifiers, and each of the 7 user identifiers may be associated with a respective account identifier of the 2 account identifiers.

Parameters including an account identifier and/or a user identifier may serve as a basis to limit or otherwise prevent access to queries according to implementations of this disclosure. For example, when a request is received from an application that includes a user identifier, the application may be granted access to only those queries associated with the user identifier. For example, if an application, such as application 101 sends a request to query server 110, query server 110 may send the request to query database 112. The application request may include user identifier 102, which is associated with query 111 and query 123. In such a circumstance, only query 111 or query 123 may be accessed in response to the application request.

In implementations of this disclosure, an account identifier may be a user identifier or a user identifier may be an account identifier. For example, an organization may grant each user the same query access, or the organization may only include a single user. In such circumstances, an organization may have an account identifier without further user identifiers. An application request may include an account identifier and the query database may include one or more queries associated directly with the account identifier. The query server may then select the associated one or more queries from the query database based on the account identifier.

Query server 110 can select a query from among queries 130 based on parameters in addition to account identifier 102 and user identifiers 200, 210, 220, 230 according to implementations of this disclosure. For example, user identifier 220 may be associated with queries 121, 122, 123. Query 123 may also be associated with a particular parameter that is not associated with query 121 and query 122. For example, the parameter may be a particular input needed for execution of a statement against target database 140. Application 101 may send a request to query server 110 that includes account identifier 102, user identifier 220, and the particular parameter. Query server 110 may determine that query 123 is associated with account identifier 102, user identifier 220, the particular parameter. In response to this determination, query server 110 may select query 123 based on this determination.

Sequences and Authentication

Figure 3:
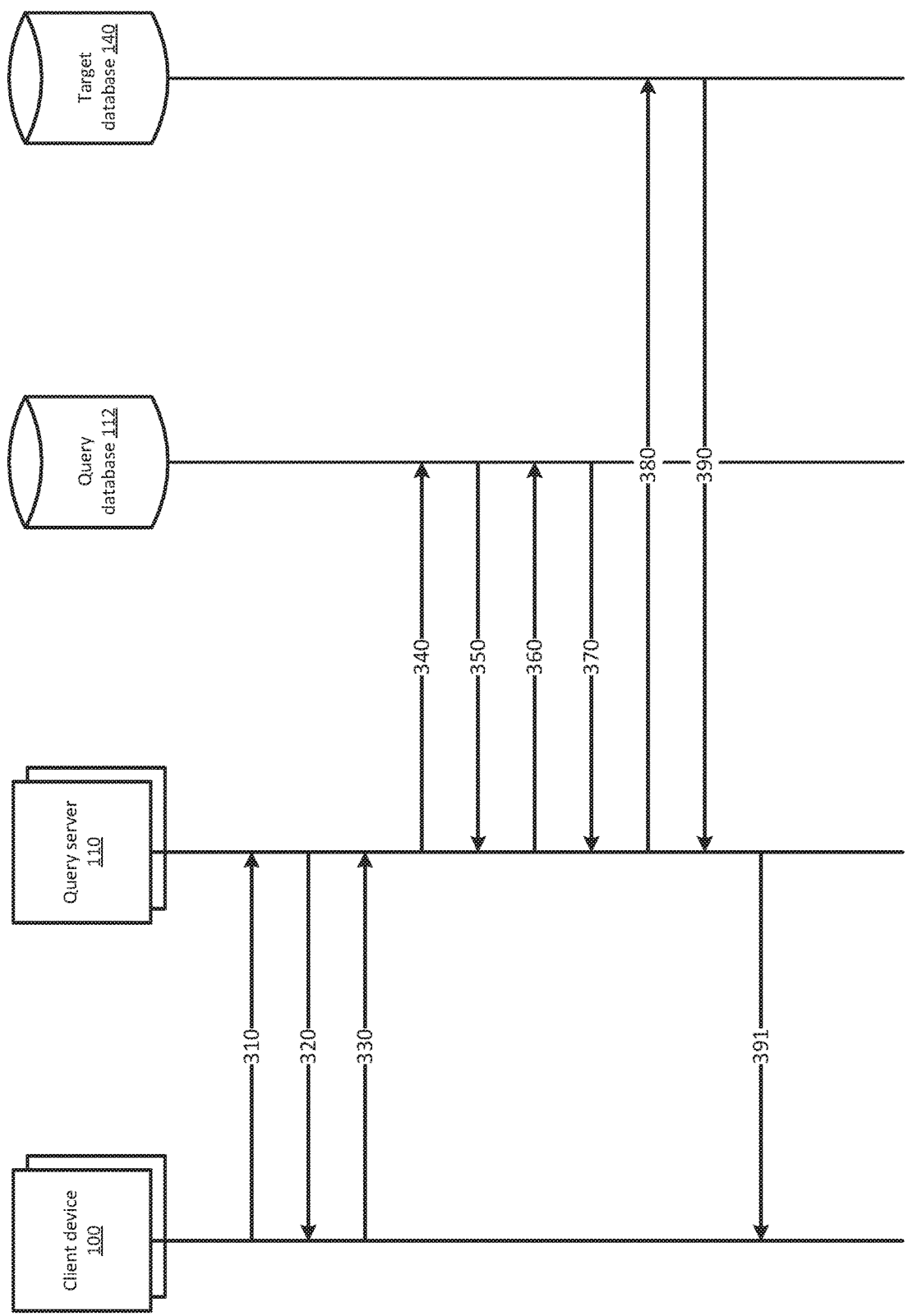
FIG. 3 shows an example sequence diagram for providing an application access to queries for execution against a target database according to an implementation of this disclosure.

Communication among components of this disclosure may occur in a variety of sequences. For example, FIG. 3 shows an example sequence diagram for providing an application access to queries for execution against a target database according to an implementation of this disclosure. At 310, application 101 executing on client device 100 may send a message including an authentication request to one or more components of query server 110. Processing of the authentication request may grant application 101 and/or client device 100 general access to other components of this disclosure, such as query server 110, query database 112, and target database 140. The authentication request may include parameters such as an authentication keys, account identifier, or other credentials suitable to authenticate the application 101 and/or client device 100 with a directory service operating in accordance with an authentication protocol, such as the Kerberos protocol.

Query server 110 may include or be in communication with an authentication server that can authenticate application 101. In some implementations, the query server 110 may function as the authentication server or query server may include multiple computing devices that include the authentication server executing a directory service. In some implementations the authentication server may be distinct from the query server 110. When executing on the same computing device as the query server 110, the authentication server may execute operations to authenticate application 101 and/or client device 100. In some implementations the query server 110 may send the authentication request to the distinct authentication server where the distinct authentication server can execute operations to authenticate application 101 and/or client device 100. The authentication request may include any parameters mentioned above, such as an account identifier associate with application 101. A directory service may authenticate application 101 based on the account identifier in accordance with any of the authentication techniques or protocols discussed herein, such as the Kerberos protocol.

At 320 the query server 110 can send a confirmation message to client device 100. In some implementation, the confirmation message sent at 320 may include one or more tickets, session keys, or other authentication parameters suitable for the purposes of this disclosure. Once application 101 and/or client device 100 is authenticated, then at 330 client device 100 may send a query request to query server 110. In implementations of this disclosure the authentication of application 101 and/or client device 100, or the authorization of a service for application 101 and/or client device 100 may include additional or fewer messages than messages 310 and 320, or the data of one or more of messages 310, 320, and 330 may be combined into a single message.

At 340 query server 110 may send a message including an authorization request to query database 112. The authorization request sent at 340 may include parameters such as account identifier 102, user identifiers 200, 210, 220, and 230, and other credentials suitable for query database 112 to determine that application 101 and/or device 100 are associated with an account that is authorized to access queries stored in query database 112. Query database 112, components of query database 112, and/or one more computing devices in communication with query database 112 may execute any authorization operations suitable for the purposes of authorizing application 101 and/or client device 100. For example, a database management system executing on one or more computing devices of the query server 110 may authorize application 101 based on a user identifier, such as user identifier 200 associated with an account identifier, such as account identifier 102. In some implementations, application 101 and/or client device 100 may be authorized to access query database 112 by executing authorization procedures in accordance with the Kerberos protocol or other authorization protocols suitable for the purposes of this disclosure.

At 350, query database 112 may send a confirmation message to query sever 110 indicating that application 101 and/or client device 100 has been authorized to access query database 112. At 360 query server 110 can send a query request to query database 112. As discussed above, the query request may include parameters such as account identifier 102 and user identifier 230. The query request can be executed against query database 112 and at 370 return a query based on parameters included in the query request, such as, for example, query 123. In implementations of this disclosure, the authorization of application 101 and/or client device 100 for access to query database 112 may include additional or fewer messages than messages 340 and 350, or the data of one or more of messages 340, 350, 360, and 370 may be combined into a single message.

After query 123 is received, query server 110 can send query 123 to target database 140 at 380. Query 123 may be executed against target database 140, and at 390 a result of the execution of query 123 against target database 140 can be returned to query server 110. Query server may process the result and generate a response in a format suitable for application 101. At 391, query server 110 may send the generated response to client device 100 for execution by application 101.

Query Selection, Query Execution, and Other Procedures

Figure 4:
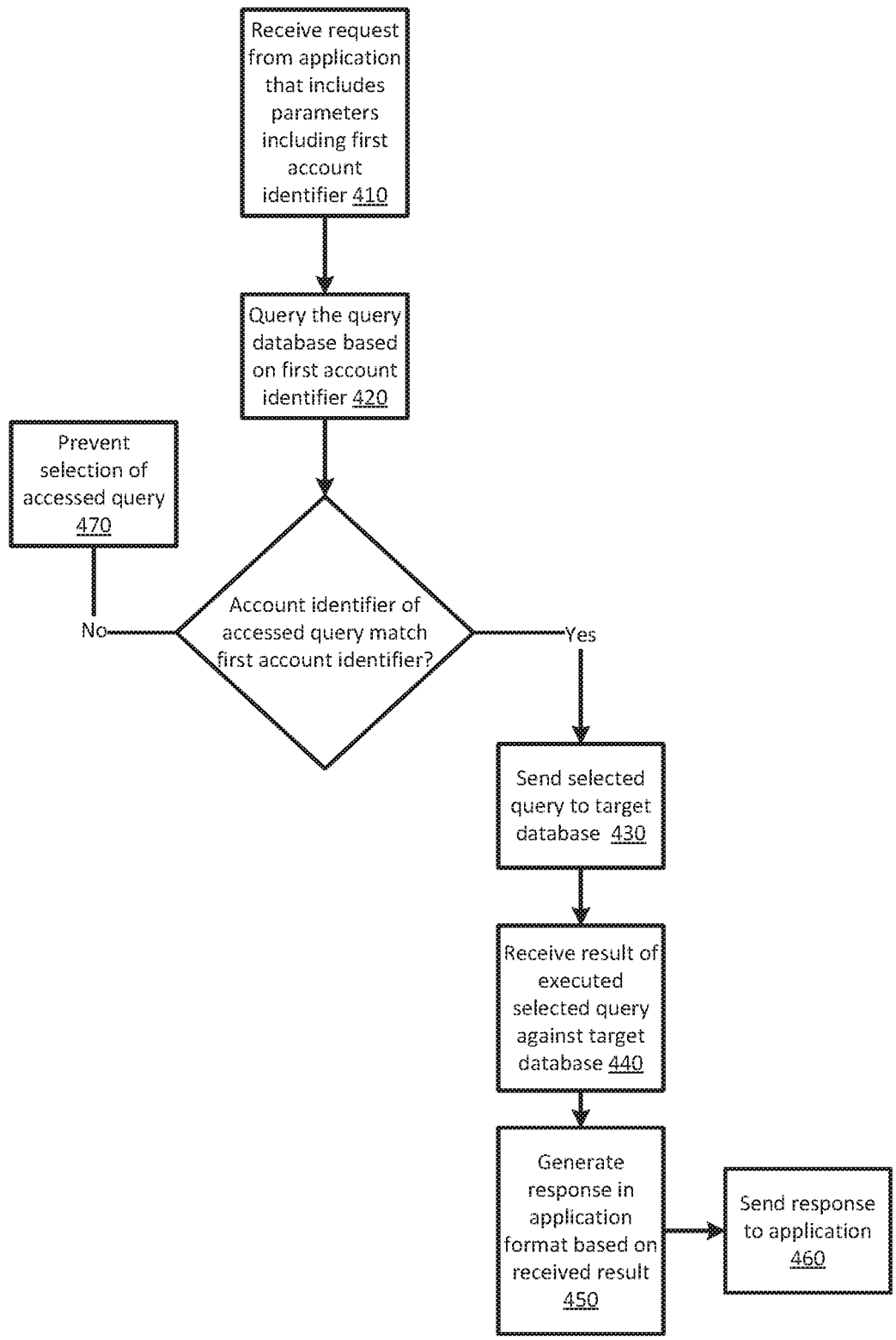
FIG. 4 shows an example procedure for selecting and executing queries against a target database according to an implementation of this disclosure.

Various procedures may execute to provide query selection, execution, and related functionality according to implementations of this disclosure. For example, FIG. 4 shows an example procedure 400 for selecting and executing queries against a target database according to an implementation of this disclosure. At 410, one or more computing devices such as query server 110 may receive a first request that includes parameters such as a first account identifier associated with a first application, such as application 101, executing on a computing device, such as client device 100.

A first database, such as query database 112 can store a set of one or more queries that are each associated with one or more parameters such as a respective account identifier of a set of account identifiers. At 420, query server 110 can submit a first request to query database 112. Query database 112 can access a stored first query and its associated account identifier, such as a second account identifier, and compare the second account identifier to the first account identifier received with the first request. For example query database 112 can be indexed by account identifiers or other parameters or indicia and queried based on these indicia. Query server 110 can determine if the second account identifier corresponds to the first account identifier. If the second account identifier does not correspond to the first account identifier, then in response, query server 110 can prevent selection of the first query at 460 based on the determination that the second account identifier does not correspond to the first account identifier. In some implementations, when an accessed account identifier is not found, then query database 112 can continue to be searched for corresponding account identifiers or other indicia.

If the accessed account identifier is determined to correspond to the first account identifier, then in response, query server 110 can select the first query. At 430, query server 110 can provide the first query to a second database, such as by sending the first query to target database 140. The first query can be executable against target database 140. The first query may operate against target database 140 and return a result. The result may be received by the query server 110 at 440.

The result of execution of the first query against the target database may be received by query server 110 in a first format. Query server 110 can generate a first response for application 101 in a second format that is different from the first format. For example, query server 110 may generate the first response in a format that is in accordance with a configuration of application 101 and/or client device 100, such as a format compatible with XML, simple object access protocol (SOAP), or JSON format at 450.

At 460, query server 110 can provide a first response to application 101 based on the received result of execution of the first query against target database 140. For example, in response to receiving the result of execution of the first query against target database 140 and generating the response in the JSON format, query server 110 can send the generated response to application 101 executing on client device 100.

Figure 5:
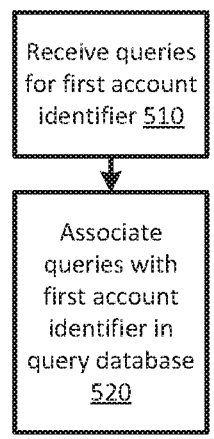
FIG. 5 shows an example procedure for defining queries for an application in a query database according to an implementation of this disclosure.

Prior to execution of the procedure discussed with respect to FIG. 4, query database 112 may receive and store certain queries for certain applications to enable the applications to make calls to query database 112 for queries to be run against target database 140. For example, FIG. 5 shows an example procedure 500 for defining queries for an application in a query database according to an implementation of this disclosure. At 510, one or more computing devices, such as query server 110 can receive one or more queries, such as the first query discussed above with respect to FIG. 4. At 520 query server 110 and/or query database 112 can associate the first query in query database 112 with the first account identifier of first application 101. The first query, the first account identifier, and their association can be stored in query database 112 for later access by the first application 101. For example the first query may be a dependency of an operation of first application 101.

Figure 6:
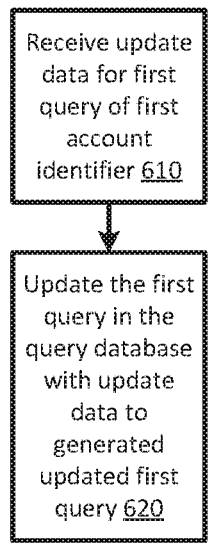
FIG. 6 shows an example procedure for updating queries for an application in a query database according to an implementation of this disclosure.

In implementations of this disclosure, queries associated with first application 101 can be changed or updated to provide different functionality for first application 101 without changing the set of instructions or code of first application 101 or the data accessed by queries for first application 101 and stored in target database 140. For example, FIG. 6 shows an example procedure 600 for updating queries for an application in a query database according to an implementation of this disclosure. At 610 one or more computing devices, such as query server 110 can receive update data for the first query. For example an administrator of the query server, first application 101, or another computer system may provide update data that can change parameters of operations of the first query, change the types of parameters accepted by the first query, change the type of statements executed by the first query, and so forth. At 620 the query server 110 can execute operations to update the first query based on the update data such that the updated first query is different from the first query.

A result from the updated first query can generate a different output of first application 101 than a result of the original first query. For example, the first query may include a first parameter when it is provided by query server 110 to a second database, such as target database 140. The target database 140 may execute the first query against target database 140 based on the first parameter. For example, execution of the first query may include calculating a range for a dataset to be accessed in target database 140 using the first parameter as an input. The calculated range may be accessed in target database 140, the dataset returned to query server 110, and generated into a first response. Query server 110 can send the generated response to first application 101, which can then execute an operation using the dataset of the first response as an input. This first execution of the operation by first application 101 can generate a first output.

The first query may be updated at a later time and result in a different dataset being returned to first application 101. As discussed above, the query server can update the first query, such as by executing update data that changes a function of the range calculation of the first query. The updated first query can be executed using the changed function and the first parameter resulting in an updated range of data to be accessed in target database 140. The data in database 140 may remain unchanged or substantially unchanged from when the original first query was executed. Application of the updated range can return an updated dataset that is different from the original dataset. Query server 110 can receive a result from execution of the updated first query against target database 140 that includes the updated dataset. Query server 110 can generate a second response that includes the updated dataset. The set of instructions and/or code of the first application 101 may remain the same or substantially the same as when application 101 operated based on the first response. Execution of the operation using the second response as input may generate a second output of first application 101 that is different from the first output.

In implementations of this disclosure, a new function or other operation of an application, such as first application 101, that accesses a target database, such as target database 140, may be implemented without needing to update a query database, such as query database 112. For example, a new operation of first application 101 can be implemented on client device 100 or a server of client device 100 and linked to an existing query within query database 112.

A first query may be associated with a first account identifier and a first parameter and stored in query database 112. An existing and/or previously executed operation of first application 101 may call the first query by sending query server 110 a first request that includes the first account identifier and the first parameter, which may serve to identify the first query in query database 112. The execution of the first query against target database 140 may return a first result that includes a first data. Query server 110 may generate a first response based on the first data and provide the first response to first application 101. First application 101 may execute the existing operation, which takes the first data as an input and generate a first output.

A new operation that has not previously been executed by first application 101 may be implemented on client device 100. First application 101 may send a second request that includes the first account identifier and the first parameter. Query server 110 can search query database 112 and identify the first query based on the first account identifier and the first parameter. Query server 110 may select the identified first query and provide the first query to target database 140. Query server 110 and/or target database 140 may apply the first query against target database 140 and target database 140 may return the first result that includes the first data. Query server 110 may generate the same first response based on the first data and provide the first response to first application 101. First application 101 may execute the new operation, which may take in the first data as an input and generate a second output. The second output may be different from the first output, for example, because the second operation may include different functionality than the first operation. In such implementations the data in database 140 may remain unchanged or substantially unchanged from when first application 101 executed the first operation.

Figure 7:
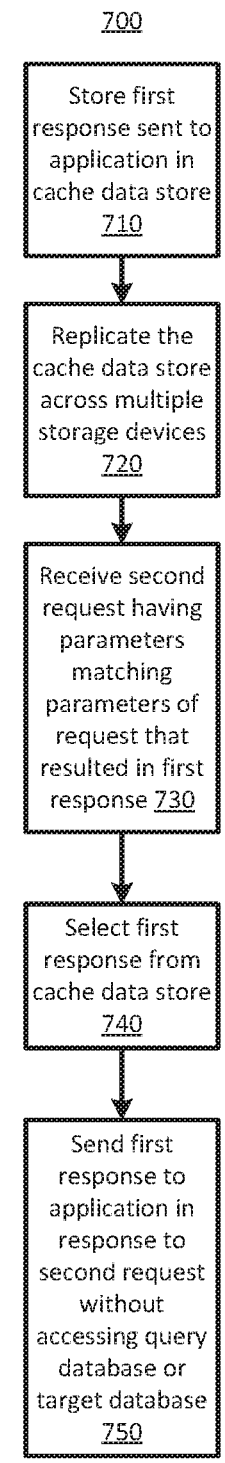
FIG. 7 shows an example procedure for providing cached responses to application requests according to an implementation of this disclosure.

Implementations of this disclosure may provide responses to certain application calls from a cache data store instead of accessing a target database. In such implementations the response times for application calls may be significantly reduced from those incurred when accessing the target database. For example, FIG. 7 shows an example procedure 700 for providing cached responses to application requests according to an implementation of this disclosure. One or more first computing devices such as query server 110 can generate a first response for an application such as first application 101 based on a received result of execution of a first query against a second database such as target database 140. The query server 110 can store the first response in a cache data store, such as cache data store 150 or any other cache data store as discussed herein. In some implementations, at 720 query server 110 may replicate the stored first response to one or more other cache data stores in addition to cache data store 150, such as by mirroring data stored in cache data store 150 to one or more geographical dispersed cache data stores implemented on a set of one or more remote storage devices.

At 730 query server 110 may receive a second request from application 101 that includes parameters matching those included in the first request. For example, the second request may include a first account identifier and a first parameter that are also included in the second request. In response to receiving the second request, query server 110 can select or otherwise read the first response from cache data store 150 without accessing query server 112 or target database 140. In some implementations, query server 110 can select or otherwise read the first response from a cache data store that is distinct from cache data store 150 and that is replicated on a storage device of a set of remote storage devices. Selecting the first response may be based on the parameters included in the second request. For example the parameters included in the second request may be compared to the parameters associated with the first request and stored in cache data store 150. Query server 110 may determine that the parameters of the second request correspond to the parameters of the first request and in response to this determination, select the first response. At 750, query server 110 can send the first response to first application 101 from cache data store 150 to first application 101 executing on client device 100.

Figure 8:
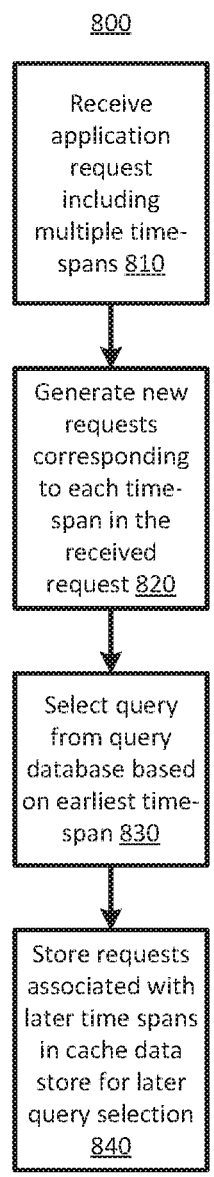
FIG. 8 shows an example procedure for segmenting time-span based application requests according to an implementation of this disclosure.

In implementations of this disclosure, applications may provide requests to access a target database over multiple time-spans. For example, FIG. 8 shows an example procedure for segmenting time-span-based application requests according to an implementation of this disclosure. At 810, one or more first computing devices, such as query server 110 may receive an application request that includes multiple time spans. For example, query server 110 can receive a first request that includes a first parameter corresponding to a first time-span and a set of one or more second parameters corresponding to one or more respective second time-spans that are later in time than the first time-span.

At 820, query server 110 can generate new requests corresponding to the time-spans included in the received request. For example, query server 110 can generate a second request having a parameter corresponding to the first time span, and a set of one or more third requests having parameters corresponding to each of the one or more respective second time-spans. For example, the received request may include a request to access the target database once per day for five days. The first time-span may be the 24 hours of the first day and the one or more second time-spans may be the 24 hours of the second day, the 24 hours of the third day, the 24 hours of the fourth day, and the 24 hours of the fifth day. Query server 110 can generate a second request having a parameter indicating the 24 hours of the first day and 4 third requests corresponding to each of the 24 hours of the second, third, forth, and fifth days. Each of the second requests and the one or more third requests may also include an account identifier and/or other parameter sufficient to serve as a basis for identifying the second request and the one or more third requests.

At 830, query server 110 can select the second request to be provided to query database 112, return a query corresponding to one or more parameters included in the second request, and provide the returned query to target database 140 within a specified time, such as the first time-span. The selection of the second request can be based on selecting a request having a parameter indicating the earliest time-frame of the time-frames included in the received requests and not having parameters indicating the later-time frames. At 840 query server 110 can store the set of third requests in a cache data store, such as cache data store 150. At later times, such as for example, times within the 24 hrs of the second, third, forth, and fifth days, query server 110 can select a request from among the third requests to be provide to query database 112.

Figure 9:
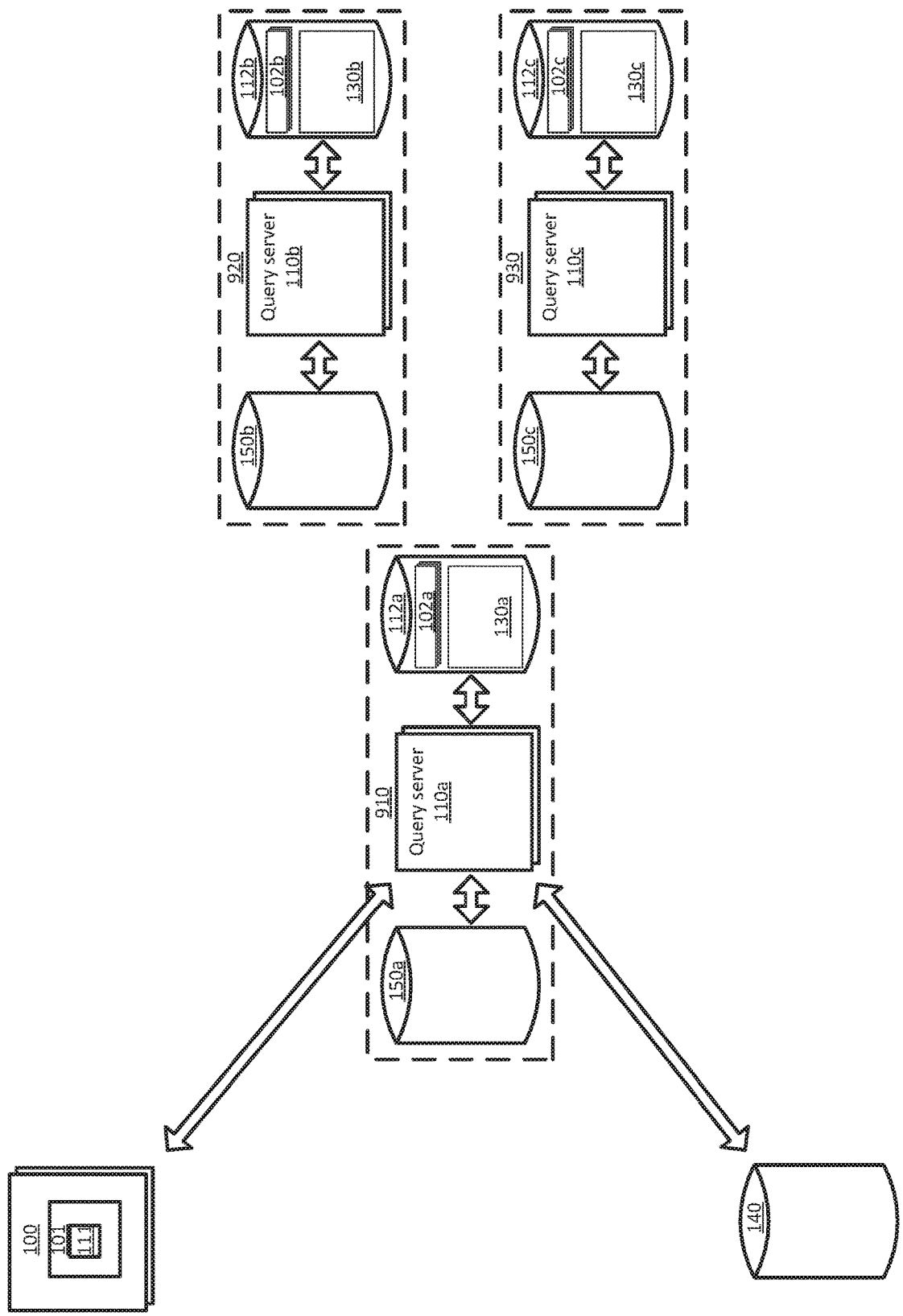
FIG. 9 shows an example system diagram of a distributed component environment according to an implementation of this disclosure.

In implementations of this disclosure procedures and related functionality can execute in a distributed component environment. FIG. 9 shows an example system diagram of a distributed component environment according to an implementation of this disclosure. For example, one or more first computing devices may include a first arrangement 910 including a first query server 110*a* in communication with first query database 112*a* storing first account identifier 102*a* and queries 130*a*, and in communication with cache data store 150*a*. The one or more first computing devices may also include a second arrangement 920 including second query server 110*b* in communication with second query database 112*b* storing second account identifier 102*b* and queries 120*b*, and in communication with cache data store 150*b*. The one or more first computing devices may also include a third arrangement 930 including a third query server 110*c* in communication with query database 112*c* storing account identifier 102*c*, and queries 130*c*, and in communication with cache data store 150*c*.

In implementations of this disclosure data and functionality store in query sever 110*a*, query database 112*a*, and cache data store 150*a* may be mirrored or otherwise replicated to query sever 110*b*, query database 112*b*, and cache data store 150*b*, and query sever 110*c*, query database 112*c*, and cache data store 150*c*, as well as components of further arrangements. Components of arrangements 910, 920, and 930 may be in communication in accordance with any of the network communication techniques or protocols discussed herein, including those discussed below with respect to FIG. 15. Although arrangements 910, 920, 930 are shown, implementations of this disclosure may include any number of arrangements suitable for the purposes of this disclosure. First application 101 associated with first account identifier 111 and executing on first computing device 100 and target database 140 may be in communication with components of arrangements 910, 920, and 930 in accordance with any of the network communication techniques discussed herein, including those discussed below with respect to FIG. 15.

Figure 10:
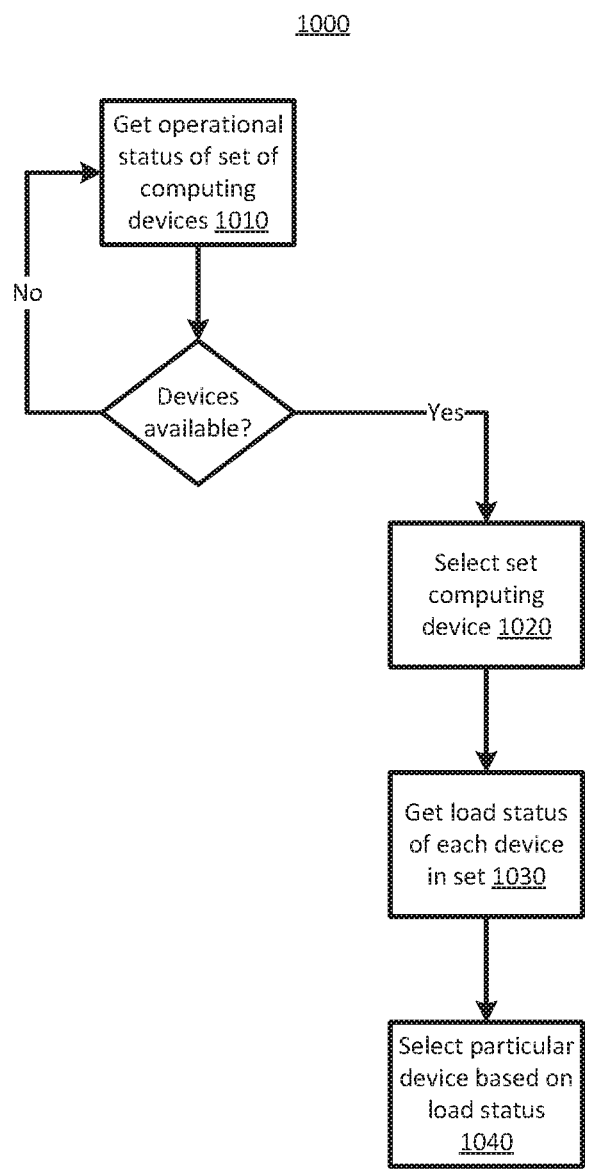
FIG. 10 shows an example procedure for selecting servers within a distributed component environment according to an implementation of this disclosure.

In implementations of this disclosure, components may operate to account for processing deficiencies, load balancing, optimization considerations, and other aspects of distributed computing. For example, FIG. 10 shows an example procedure 1000 for selecting servers within a distributed component environment according to an implementation of this disclosure. At 1010, in response to receiving a query request from an application, such as first application 101, a particular computing device of a set of one or more computing devices, may determine an operational status of a monitored computing device of the one or more computing devices. For example, in some implementations, the particular computing device may be a component of query server 110, a distinct computing device in communication with query server 110, or may be the same computing device as query sever 110. The monitored computing device may be a computing device that is a component of query server 110, a distinct computing device in communication with query server 110, or may be the same computing device as query sever 110. The operational status may include whether the monitored computing device or components thereof, such as processors, storage devices, network interfaces, and so forth are operating in accordance with performance thresholds or are otherwise available.

In an example, the particular computing device may be a component of arrangement 910 and may request and receive an indicator of an operating measurement from the monitored computing device, which may be query server 110*a*. The requested indicator may indicate, for example, whether the monitored computing device is offline. If query server 110*a* is available, then in response at 1020, the particular computing device may select the monitored computing device based on the determined operational status. If the monitored computing device is not available, then the particular computing device may request and receive an indicator of an operating measurement from another monitored computing device. For example, the particular computing device can request the operational status of query server 110*b*.

In some implementations, a query server, such as query server 110*a* may include a set of multiple servers. At 1030 the particular computing device may determine a load status, such as a quantity of received requests that are assigned to each of the set of multiple servers. A particular server of the set of servers may be selected at 1040 based on the determination of the load status of each server. For example, arrangement 910 may be in communication with multiple applications in addition to application 101. Each application may send multiple requests to arrangement 910 to access query database 112*a*. These query requests may be assigned among each of the servers of the set of servers such that each server has query requests pending for execution by the servers. When a new query request is received from an applications, the particular computing device can access the current number of pending query requests for each server of the set of servers and select the server that has the lowest number of pending quests. The particular computing device can then send the new query request to the selected server. In other implementations, a load status may be based on processing demand, latency, or other limitations on the execution of operations by a server that are suitable for the purposes of this disclosure.

Figure 11:
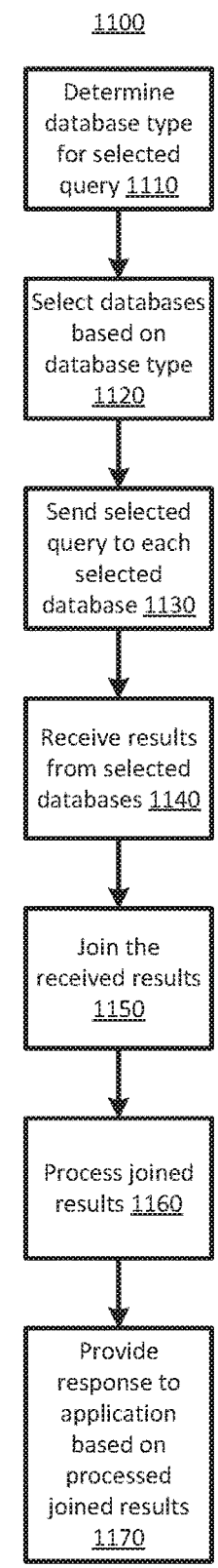
FIG. 11 shows an example procedure for selecting databases and processing query results within a distributed component environment according to an implementation of this disclosure.

In implementations of this disclosure, a target database may be selected based on a database type associated with the target database. For example, FIG. 11 shows an example procedure 1100 for selecting databases and processing query results within a distributed component environment according to an implementation of this disclosure. A query may have been selected from a query database by one or more computing devices, such as query server 110, and at 1110 the query database may determine a database type associated with the query. For example, the selected query may include parameters that indicate a database type or parameters indicating the database type may be included in a request from application 101.

A database type for a database may include an indicator that the database includes data relevant to an application. For example, application 101 may execute procedures to model atomic phenomena based on spectroscopic data. Target database 140 may store spectroscopic data collected from various spectroscopic studies, such as study "X". A database type for target database 140 may be "spectroscopic database", "database X", or any other indicator that associates application 101 with target database 140. A database type may also include an indicator of how the database is structured, managed, accessed, or otherwise functions. For example, a database type may include any database type discussed above with respect to FIG. 1. For example application 101 may execute procedures over large datasets stored in Apache HBase databases. Target database 101 may be an Apache HBase database, and a database type for target database 140 may be "HBase". In general, a database type may be any set of data sufficient to identify a particular target database from among multiple potential target databases At 1120 query server 110 can select one or more target databases based on their database types. For example, in implementations of this disclosure, there may be multiple potential target databases, each associated with a database type. Query server 110 may read a database type from data included in a selected first query or a request received from first application 101 and compare the read database type to the database types associated with each of the multiple potential target databases. One or more of the potential target databases may be associated with the read database type, and in response these target databases may be selected by query server 110. In response to selecting the target databases, query server 110 may send or otherwise provide the first query to each of the selected target databases at 1130. In implementations of this disclosure, the selected target databases may be remote or proximate to query server 110.

In implementations of this disclosure, execution of the first query against each of the selected target databases may be performed substantially in parallel. For example, each of the selected target databases may store similar or substantially the same datasets. For example, a dataset may be replicated across each of the selected target databases. The first query may execute against a first portion of the dataset on a first selected target database and the first query may execute against a second portion of the dataset on a second selected target database.

Results of the execution of the first query against each portion of the dataset may be returned to query server 110 for further processing. For example, at 1150 the results may be joined or otherwise combined in accordance with any suitable database operation and formatted in accordance with a configuration of application 101. In some implementations, such as is shown at 1160 the results may be processed by query server 110 based on a parameter included in the selected query, before and/or after being joined. For example, query server 110 may execute procedures to remove duplicate data from the results, filter the results using a parameter included in the selected query or as indicated by a parameter included in the selected query, normalize the results as indicated by a parameter included in the selected query, smooth the results using a parameter included in the selected query or as indicated by a parameter included in the selected query, and so forth. In implementations of this disclosure query server 110 may generate a first response for first application 101 based on the processed joined results of the execution of the first query against each of the selected target databases. At 1170, query server 110 may send or otherwise provide the generated first response to first application 101.

Figure 12:
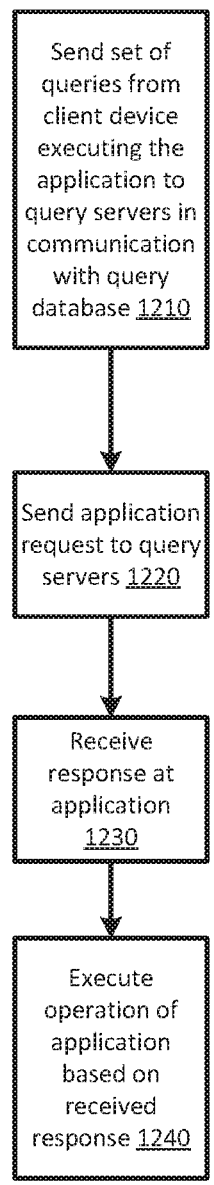
FIG. 12 shows an example procedure for executing an application procedure based on a requested query result according to an implementation of this disclosure.

Implementations of this disclosure, including aspects of procedures discussed throughout this disclosure, may operate in or with various components of the component environment discussed above with respect to FIG. 1. For example, FIG. 12 shows an example procedure 1200 for executing an application procedure based on a requested query result according to an implementation of this disclosure. A computing device, such as client device 100 may execute application 101 associated with first account identifier 102. At 1210 client device 101 may send or otherwise provide one or more queries associated with first account identifier 102 including a first query to one or more computing devices, such as the query sever 110. The one or more queries including the first query may be a dependency of an operation of first application 101. Query server 110 may receive the one or more queries and store the one or more queries in query database 112.

At 1220, client device 100 may provide or otherwise send a first request to query server 110 that includes parameters such as first account identifier 102 associated with first application 101. For example, client device 100 may execute an operation of first application 101 that has a dependency on the first query. Query server 110 may access query database 112, select the first query, apply the first query to target database 140, receive a first result, and provide a response based on the first result to client device 100. At 1230, client device 100 can receive the response, and at 1240 client device 100 can execute an operation of application 101 based on the response that generates a first output. For example, the operation may take the response as an input, process the input, and generate the first output of application 101.

In implementations of this disclosure, first application 101 can provide new functionality without deploying code for first application 101. For example, query server 110 and/or query database 112 can update the first query in query database 112. Client device 100 can send or otherwise provide a second request to query server 110 that includes parameters such as first account identifier 102. For example, client device 100 may execute the operation of first application 101 that has the dependency on the first query. Query server 110 may access query database 112, select the updated first query, apply the updated first query to target database 140, receive a second result different from the first result, and provide a second response that is different from the first response based on the second result to client device 100. At 1230, client device 100 can receive the second response, and at 1240 client device 100 can execute an operation of application 101 based on the second response that generates a second output that is different from the first output. In such implementations, a set of instructions or code including first application 101 may remain unchanged or substantially unchanged and all or substantially all data accessed in target database 140 by the first query may be the same as all or substantially all data accessed in target database 140 by the updated first query In implementations of this disclosure, an example of the first request provided by first application 101 discussed above may include a request having a parameter that requests insertion of one million or more rows into target database 140. The first query may include a bulk insert operation on target database 140, and the first response may include an indicator that confirms that the bulk insert operation was completed successfully.

In implementations of this disclosure, first application 101 may execute on client device 100 in accordance with a first execution environment. For example, first application 101 can execute in accordance with an execution environment of query sever 110 that has a non-blocking, asynchronous, event-driven architecture. The first execution environment may be different from a second execution environment of an application server of query server 110. The second execution environment may be an environment that includes a framework class library and a common language runtime.

In implementations of this disclosure, first application 101 may execute novel operations using existing queries stored in query database 140. For example, an existing operation of application 101, such as that discussed above, may have a dependency on a first query that may be associated with first account identifier 102. The existing operation may take a first response from query server 110 as an input, process the first response, and generate a first output. A new second operation of first application 101 may also have a dependency on the first query. Client device 100 may send or otherwise provide a second request that includes first account identifier 102 to query sever 110 along with an additional first parameter. Query server 110 may access query database 112, select the first query based on the first account identifier 102, apply the first query and the new second parameter to target database 140, receive a second result different from the first result, and provide a second response different from the first response to client device 100. The second result and second response may be different from the first result and first response, for example, because the first query may perform an operation using the second parameter when accessing target database 140. The new operation of first application 101 may take the second response as an input, process the second response, and generate a second output that may be different or the same as first output depending on the functionality of the new operation.

Figure 13:
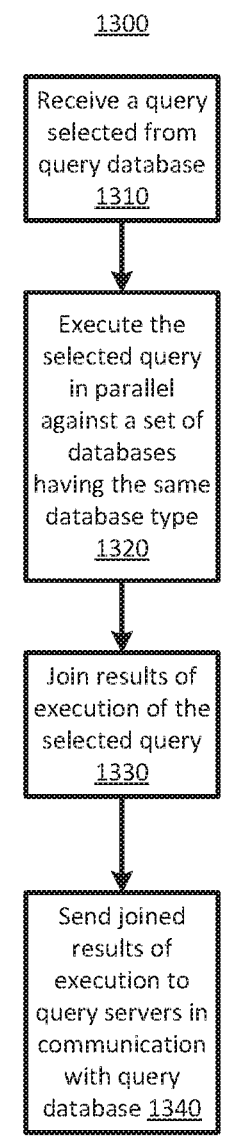
FIG. 13 shows an example procedure for executing a selected query against a target database according to an implementation of this disclosure.

Implementations of this disclosure, including aspects of procedures discussed throughout this disclosure, may operate in or with various components of the component environment discussed above with respect to FIG. 1. For example, FIG. 13 shows an example procedure 1300 for executing a selected query against a target database according to an implementation of this disclosure. At 1310, one or more first processors and/or a computing devices in communication with a first target database 140 may receive a query, such as a first query, selected from query database 112. The first query may have been selected by query server 110 from among a set of queries stored in query database 112.

One or more second processors in communication with one or more second target databases 140 having some or all of the same dataset as is stored on first target database 140 may also receive the first query. The one or more first processors may execute the first query against a first portion of the dataset, and the one or more second processors may each execute the first query against one or more second portions of the dataset substantially in parallel with the one or more first processors. The first target database 140 and one or more second target databases 140 may each have the same database type. In some implementations, there may not be parallel or distributed processing, such that the first query is only applied against first target database 140.

The one or more first processors may return a result of execution of the first query against the first target database 140. In implementations without parallel or distributed processing the one or more first processors may provide to query server 110, the returned result of execution of the first query against first target database 140. In implementations with parallel or distributed processing, the one or more first processors may receive the results of execution of the first query by the one or more second processors. In such implementations, the one or more first processors, may provide to query sever 110, the returned result of execution of the first query against the first target database 140 and the one or more second target databases 140.

In response to receiving results of execution of the first query, at 1330, the one or more first processors can join all of the results of execution of the first query using database operations such as is discussed elsewhere herein. In response to the joining operation, the one or more first processors may provide the joined results to query server 110 at 1340.

Other Components

Implementations of the disclosure may operate in and with a variety of component and network architectures. FIG. 14 is an example computing device 1400, suitable for implementations of the disclosure. Computing devices, such as computing device 1400, may include computers, servers, mainframes, desktops, laptops, tablets, smart phones, wearable devices, and other computing devices. The computing device 1400 includes a bus 1410 which interconnects major components of the computing device 1400, such as a central processor 1480, a memory 1470 (typically RAM, but which may also include ROM, flash RAM, or the like), an input/output controller 1460, a user display 1420, such as a display screen via a display adapter, a user input interface 1430, which may include one or more controllers and associated user input devices such as a keyboard, mouse, and the like, and may be closely coupled to the I/O controller 1460, fixed storage 1440, such as a hard drive, flash storage, Fibre Channel network, SAN device, SCSI device, and the like, and a removable media component 1450 operative to control and receive an optical disk, flash drive, and the like.

The bus 1410 allows data communication between the central processor 1480 and the memory 1470, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computing device 1400 are generally stored on and accessed via a computer-readable medium, such as a hard disk drive (e.g., fixed storage 1440), an optical drive, floppy disk, or other storage medium.

The fixed storage 1440 may be integral with the computing device 1400 or may be separate and accessed through other interfaces. A network interface 1490 may provide a direct connection to a remote server via a telephone link, to the Internet via an internet service provider (ISP), or a direct connection to a remote server via a direct network link to the Internet via a POP (point of presence) or other technique. The network interface 1490 may provide such connection using wireless techniques, including digital cellular telephone connection, Cellular Digital Packet Data (CDPD) connection, digital satellite data connection or the like. For example, the network interface 1490 may allow the computing device to communicate with other computing devices via one or more local, wide-area, or other networks, as shown in FIG. 15.

Many other devices or components (not shown) may be connected in a similar manner (e.g., document scanners, digital cameras and so on). Conversely, all of the components shown in FIG. 14 need not be present to practice the present disclosure. The components can be interconnected in different ways from that shown. The operation of a computing device such as that shown in FIG. 14 is readily known in the art and is not discussed in detail in this application. Code or instructions to implement this disclosure can be stored in computer-readable storage media such as one or more of the memory 1470, fixed storage 1440, removable media 1450, or on a remote storage location.

Figure 15:
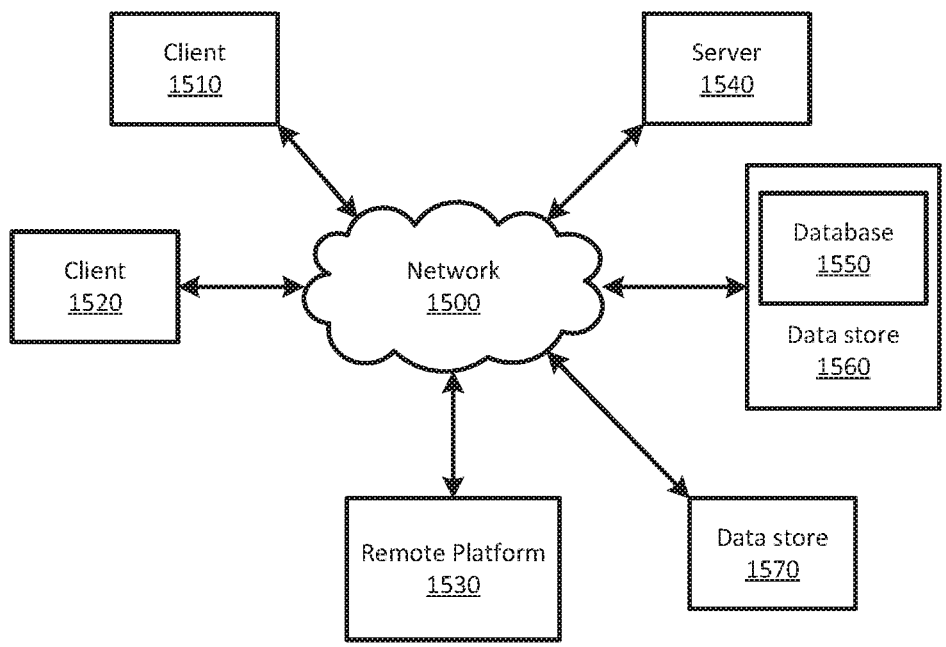
FIG. 15 shows an example network arrangement according to an implementation of this disclosure.

FIG. 15 shows an example network arrangement according to an implementation of the disclosure. One or more clients 1510, 1520, such as local computing devices, smart phones, tablet computing devices, and the like may connect to other devices via one or more networks 1500. The network may be a local network, wide-area network, the Internet, or any other suitable communication network or networks, and may be implemented on any suitable platform including wired and/or wireless networks. The clients may communicate with one or more servers 1540 and/or databases 1550. The devices may be directly accessible by the clients 1510, 1520, or one or more other devices may provide intermediary access such as where a server 1540 provides access to resources stored in a database 1550. Database 1550 may be implemented on a data store 1560, whereas data store 1570 may store data in a non-database format. A data store may be any suitable combination of hardware and software for storing structured and/or unstructured data. The clients 1510, 1520 also may access remote platforms 1530 or services provided by remote platforms 1530 such as cloud computing arrangements and services. The remote platform 1530 may include one or more servers and/or databases.

In various implementations of this disclosure, computing device 1500 may function as any of the one or more computing devices and discussed above with respect to FIGS. 1-13. Components of network arrangement 1600 may provide connectivity and other functionality discussed above with respect to FIGS. 1-13.

More generally, various implementations of this disclosure may include or be implemented in the form of computer-implemented procedures or processes and apparatuses for practicing those processes. Implementations also may be implemented in the form of a computing device program product having instructions or computer program code containing instructions implemented in non-transitory and/or tangible media, such as floppy diskettes, CD-ROMs, hard drives, USB (universal serial bus) drives, or any other machine readable storage medium, wherein, when the computing device program code is loaded into and executed by a computing device, the computing device becomes an apparatus for practicing implementations of the disclosure.

Implementations also may be implemented in the form of computer program code, for example, whether stored in a storage medium, loaded into and/or executed by a computing device, or transmitted over some transmission medium, such as over electrical wiring or cabling, through fiber optics, or via electromagnetic radiation, wherein when the computer program code is loaded into and executed by a computing device, the computing device becomes an apparatus for practicing implementations of the disclosure. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosure in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosure.

The foregoing description, for purpose of explanation, has been described with reference to specific implementations. However, the illustrative discussions above are not intended to be exhaustive or to limit implementations of the disclosure to the precise forms disclosed. Headings included in the text of this disclosure are not intended to be limiting in any way. Many modifications and variations are possible in view of the above teachings. The implementations were chosen and described in order to explain the principles of implementations of the disclosure and their practical applications, to thereby enable others skilled in the art to utilize those implementations as well as various implementations with various modifications as may be suited to the particular use contemplated.

The invention claimed is:

1. A method comprising:

selecting, by one or more first computing devices based on a received first request that includes a first account identifier associated with the first application executing on a second computing device, a first query from among a plurality of queries stored in the first database, wherein each of the plurality of queries are associated with a respective account identifier of a plurality of account identifiers, the plurality of account identifiers include the first account identifier, and the first account identifier includes one or more user identifiers; and executing the first query against a second database, wherein an operation of the first application executing on the second computing device is dependent upon the first query;

providing, by the one or more first computing devices, the first query to the second database; and providing, by the one or more first computing devices to the first application, a first response based on a received result of execution of the first query against the second database; and completing the operation, at the second computing device, of the first application based on the provided first response to generate a first output;

wherein the first request includes a first parameter corresponding to a first time-span and one or more second parameters corresponding to one or more respective second time spans that are later than the first time-span, the method further comprising:

in response to receiving the first request, generating, by the one or more first computing devices, a second request including the first parameter and one or more third requests each corresponding to a respective one of the one or more second parameters, and storing, by the one or more first computing devices, the one or more third requests in a cache data store, wherein the selection of the first query is further based on the first parameter and not the one or more second parameters.

2. The method of claim 1, further comprising:

associating, by the one or more first computing devices, the one or more queries with the first account identifier in the first database.

3. The method of claim 1, wherein:

the provision of the first query to the second database further comprises providing, by the one or more first computing devices, a first parameter to the second database, the first response is further based on a received result of execution of the first query against the second database based on the first parameter, and the execution of the operation is a first execution of the operation by the first application based on the first response to generate the first output, the method further comprising:

updating, by the one or more first computing devices, the first query, wherein the updated first query is different from the first query;

providing, by the one or more first computing devices, the updated first query and the first parameter to the second database;

receiving, by the one or more first computing devices, a result of execution of the updated first query against the second database based on the first parameter; and providing, by the one or more first computing devices to the first application, a second response based on the result of execution of the updated first query against the second database based on the first parameter, wherein, a second execution of the operation by the first application based on the second response generates a second output different from the first output, and during the first execution of the operation and the second execution of the operation:

a set of instructions comprising the first application is unchanged, and data accessed in the second database by the first query is the same as data accessed in the second database by the updated first query.

4. The method of claim 1, wherein the association of each of the plurality of queries with a respective account identifier of the plurality of account identifiers comprises:

an association of each of the plurality of queries with a respective user identifier of a plurality of user identifiers; and an association of each of the plurality of user identifiers with a respective account identifier of the plurality account identifiers.

5. The method of claim 1, wherein:

the first request comprises a request to insert one million or more rows into the second database;

the first query comprises a bulk insert operation on the second database; and the first response comprises a confirmation that the bulk insert operation was completed successfully.

6. The method of claim 1, wherein:

the one or more first computing devices comprise a first application server and a second application server;

the first application server executes operations in accordance with a first execution environment;

the second application server executes operations in accordance with a second execution environment; and the first execution environment is different from the second execution environment.

7. The method of claim 1, wherein:

the one or more first computing devices comprise a first application server and a second application server;

the first application server executes operations in accordance with an environment comprising a non-blocking, asynchronous, event-driven architecture; and the second application server executes operations in accordance with an environment comprising a framework class library and a common language runtime.

8. The method of claim 1, wherein the plurality of queries include a second query associated with a second account identifier that does not correspond to the first account identifier, the method further comprising:

determining, by the one or more first computing devices, that the second account identifier does not correspond to the first account identifier; and preventing, by the one or more first computing devices, selection of the second query based on the determination that the second account identifier does not correspond to the first account identifier.

9. The method of claim 1, wherein the selection of the first query comprises comparing a first user identifier associated with the first account identifier to a second user identifier associated with one or more queries of the plurality of queries.

10. The method of claim 1, further comprising:

receiving, by the one or more first computing devices, the first request, wherein:

the first request further includes a first parameter, the first query is associated with the first parameter, and the selection of the first query is further based on the first parameter.

11. The method of claim 1, wherein:
the first request further includes a first parameter,
the first query is associated with the first parameter,
the selection of the first query is further based on the first parameter, and
the first request is associated with a first operation that has previously been executed by the first application; the method further comprising:
receiving, by the one or more first computing devices, a second request, wherein:
the second request includes the first account identifier and the first parameter, and
the second request is associated with a second operation that has not previously been executed by the first application;
selecting, by the one or more first computing devices, the first query based on the first account identifier and the first parameter;
providing, by the one or more first computing device, the first query to the second database; and
providing, by the one or more first computing devices to the first application, a second response based on a received result of execution of the first query against the second database, wherein the second response is an input to the second operation.

12. The method of claim 1, further comprising:
authenticating, by a directory service executing on the one or more first computing devices, the first application based on the first account identifier; and
authorizing, by a database management system executing on the one or more first computing devices that manages the first database, the first application based on a first user identifier associated with the first account identifier.

13. The method of claim 1, further comprising:
receiving, by the one or more first computing devices from the second database, the result of the execution of the first query against the second database in a first format; and
generating, by the one or more first computing devices, the first response in a second format different from the first format and based on the received result of the execution of the first query,
wherein the second format is in accordance with a configuration of the second computing device.

14. The method of claim 1, wherein:
the first request further includes a first parameter associated with the first query in the first database, and
the selection of the first query is further based on the first parameter.

15. The method of claim 1, wherein the first request further includes a first
parameter, the method further comprising:
storing, by the one or more first computing devices, the first response in a cache data store;
receiving, by the one or more first computing devices, a second request including the first account identifier and the first parameter; and
in response to the second request, providing by the one or more first computing devices, the first response from the cache data store to the first application.

16. The method of claim 1, wherein the first request further includes a first parameter, the method further comprising:
storing, by the one or more first computing devices, the first response in a cache data store;
replicating, by the one or more first computing devices, the cache data store across a plurality of storage devices;
receiving, by the one or more first computing devices, a second request including the first account identifier and the first parameter;
in response to the second request, reading, by the one or more first computing devices, the first response from the cache data store replicated on a first storage device of the plurality of storage devices; and
in response to reading the first response from the cache data store, providing, by the one or more first computing devices, the first response to the first application.

17. The method of claim 1, further comprising:
in response to receipt of the first request, determining, by a particular computing device of a plurality of computing devices that include the one or more first computing devices, an operational status of the one or more first computing devices; and
selecting, by the particular computing device, the one or more first computing devices based on the determination of the operational status.

18. The method of claim 1, further comprising:
in response to receipt of the first request, determining, by a particular computing device of a plurality of computing devices that include the one or more first computing devices, a quantity of received requests assigned to each of a plurality of servers of the one or more first computing devices; and
selecting, by the particular computing device, a particular server of the plurality of servers based on the determination of the quantity of received requests assigned to each of the plurality of servers,
wherein the selection of the first query comprises selection of the first query by the particular server.

19. The method of claim 1, wherein the second database is one of a plurality
of remote databases, the method further comprising:
determining, by the one or more first computing devices, a database type for the first query,
selecting, by the one or more computing devices, two or more remote databases of the plurality of remote databases based on the database type,
providing, by the one or more computing devices, the first query to each of the selected two or more remote databases.

20. The method of claim 1, further comprising:
providing, by the one or more first computing devices, the first query to a third database distinct from the second database, wherein the third database and the second database are associated with the same database type;
receiving, by the one or more first computing devices, the result of execution of the first query against the second database, and the result of execution of the first query against the third database,
wherein the execution of the first query against the second database and the third database is in parallel, and the first response is further based on the result of execution of the first query against the third database.

21. The method of claim 1, further comprising:
receiving, by the one or more first computing devices, the result of execution of the first query against the second database, and a result of execution of the first query against a third database distinct from the second database, wherein the execution of the first query against the second database and the third database is in parallel;

joining, by the one or more first computing devices, a result of execution of the first query against the second database and a result of execution of the first query against the third database; and processing, by the one or more first computing devices, the joined results of execution of the first query, based on a parameter included in the first query, wherein the first response is further based on the processed joined results of the execution of the first query.

22. A non-transitory, computer-readable medium storing instructions that, when executed by a processor, cause the processor to perform operations comprising:

providing, to one or more first computing devices by a second computing device executing a first application, a first request that includes a first account identifier associated with the first application, the first account identifier associated with a first query of a plurality of queries stored in a first database in communication with the one or more first computing devices, and wherein the first account identifier includes one or more user identifiers;

executing the first query executable against a second database, wherein a first operation of the first application is dependent upon the first query;

receiving, by the second computing device from the one or more first computing devices, a first response based on a result of execution of the first query against the second database;

completing, by the second computing device, the first operation of the first application based on the first response;

wherein the first request includes a first parameter corresponding to a first time-span and one or more second parameters corresponding to one or more respective second time spans that are later than the first time-span, the method further comprising:

in response to receiving the first request, generating, by the one or more first computing devices, a second request including the first parameter and one or more third requests each corresponding to a respective one of the one or more second parameters, and storing, by the one or more first computing devices, the one or more third requests in a cache data store, wherein the selection of the first query is further based on the first parameter and not the one or more second parameters.

23. The non-transitory, computer-readable medium of claim 22, wherein the instructions further comprise:

prior to providing the first request, providing, by the second computing device, one or more queries comprising the first query to the one or more first computing devices, wherein each of the one or more queries is associated with the first account identifier.

24. The non-transitory, computer-readable medium of claim 22, wherein the instructions further comprise:

generating, by the second computing device, a first output in response to the execution of the first operation based on the first response;

providing, by the second computing device, a second request that includes the first account identifier;

receiving, by the second computing device from the one or more first computing devices, a second response based on a result of execution of an updated first query against the second database;

executing, by the second computing device, the first operation based on the second response; and generating, by the second computing device, a second output that is different from the first output in response to the execution of the first operation based on the second response, wherein during the execution of the first operation based on the first response and the execution of the first operation based on the second response:

a set of instructions comprising the first application is unchanged, and data accessed in the second database by the first query is the same as data accessed in the second database by the updated first query.

25. The non-transitory, computer-readable medium of claim 22, wherein:

the first request comprises a request to insert one million or more rows into the second database;

the first query comprises a bulk insert operation on the second database; and the first response comprises a confirmation that the bulk insert operation was completed successfully.

26. The non-transitory, computer-readable medium of claim 22, wherein:

the first application executes operations that interface with a first execution environment of a first application server of the one or more first computing devices;

a second application server of the one or more first computing devices executes operations in accordance with a second execution environment; and the first execution environment is different from the second execution environment.

27. The non-transitory, computer-readable medium of claim 22, wherein:

the first application executes operations that interface with a first execution environment of a first application sever of the one or more first computing devices, wherein the first execution environment comprises a non-blocking, asynchronous, event-driven architecture; and a second application server of the one or more first computing devices executes operations in accordance with a second execution environment comprising a framework class library and a common language runtime.

28. The non-transitory, computer-readable medium of claim 22, wherein:

the first request further includes a first parameter;

the first query is associated with the first parameter; and the selection of the first query is further based on the first parameter; the instructions further comprising:

providing, by the second computing device to the one or more first computing devices, a second request that includes the first account identifier, the first parameter, and a second parameter different from the first parameter;

receiving, by the second computing device from the one or more first computing devices, a second response based on a result of execution of the first query against the second database;

executing, by the second computing device, a second operation that has not previously been executed by the second computing device, based on the second response.

29. A system comprising: one or more first processors; and a non-transitory, computer-readable medium in communication with the one or more first processors and storing instructions that, when executed by the one or more first processors, cause the one or more first processors to perform operations comprising:
    receiving, by the one or more first processors from one or more first computing devices, a first query, wherein the first query is selected by the one or more first computing devices from among a plurality of queries stored in a first database based on a first account identifier associated with the first query, wherein the first account identifier include one or more user identifiers, and wherein an operation of the first application dis dependent upon the first query;
    executing, by the one or more first processors, the first query against a second database in communication with the one or more first processors;
    providing, by the one or more first processors to the one or more first computing devices, a result of execution of the first query against the second database; and
    completing the first operation, at the one or more first processors, of the first application based on the provided first response to generate a first output;
    wherein the first request includes a first parameter corresponding to a first time-span and one or more second parameters corresponding to one or more respective second time spans that are later than the first time-span, the method further comprising:
    in response to receiving the first request, generating, by the one or more first computing devices, a second request including the first parameter and one or more third requests each corresponding to a respective one of the one or more second parameters, and
    storing, by the one or more first computing devices, the one or more third requests in a cache data store,
    wherein the selection of the first query is further based on the first parameter and not the one or more second parameters.

30. The system of claim 29, wherein:
    the second database is one of a plurality of databases having a database type; and
    the instructions further comprise:
        executing, by the one or more first processors, the first query against a third database of the plurality of databases having the database type and in communication with the one or more first processors, and
        providing, by the one or more first processors to the one or more first computing devices, a result of execution of the first query against the third database.

31. The system of claim 29, wherein:
    the second database is one of a plurality of databases having a database type; and
    the instructions further comprise:
        executing, by the one or more first processors, the first query against a third database of the plurality of databases having the database type and in communication with the one or more first processors, and
        providing, by the one or more first processors to the one or more first computing devices, a result of execution of the first query against the third database,
        wherein the execution of the first query against the second database and the third database is in parallel.

32. The system of claim 29, wherein:
    the second database is one of a plurality of databases having a database type; and
    the instructions further comprise:
        executing, by the one or more first processors, the first query against a third database of the plurality of databases having the database type and in communication with the one or more first processors,
        and prior to providing the result of execution of the first query against the second database, joining, by the one or more first processors, a result of execution of the first query against the third database to the result of execution of the first query against the second database,
        wherein the execution of the first query against the second database and the third database is in parallel.

* * * * *